(No Model.)
W. H. KELLY.
VALVE.
No. 443,833. Patented Dec. 30, 1890.
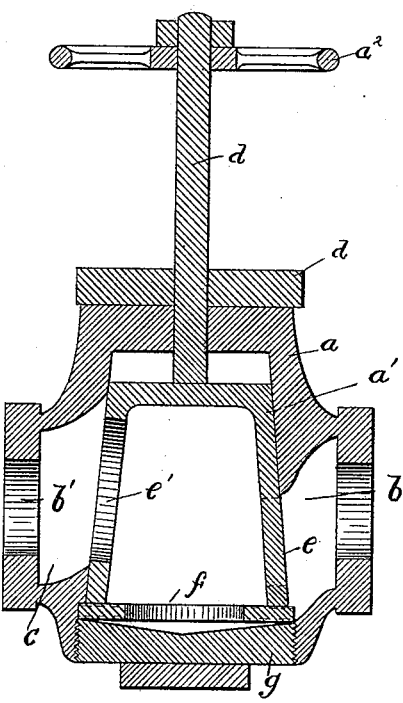
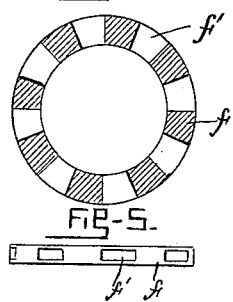
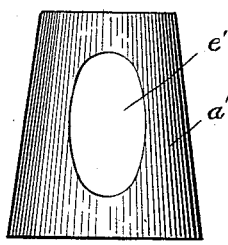
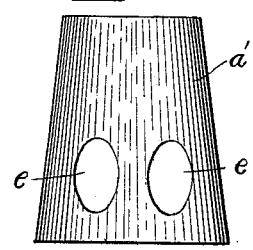
WITNESSES
INVENTOR
William H. Kelly,

UNITED STATES PATENT OFFICE.

WILLIAM H. KELLY, OF WARREN, RHODE ISLAND.

VALVE.

SPECIFICATION forming part of Letters Patent No. 443,833, dated December 30, 1890.

Application filed March 12, 1890. Serial No. 343,655. (No model.)

*To all whom it may concern:*

Be it known that I, WILLIAM H. KELLY, of Warren, county of Bristol, State of Rhode Island, have invented an Improvement in Valves, of which the following description, in connection with the accompanying drawings, is a specification, like letters on the drawings representing like parts.

Much difficulty has heretofore been experienced in providing a stuffing-box for a valve which will not leak, more particularly when the valve is used for superheated steam, the packing in such case melting or burning.

This invention has for its object to construct a valve which may be employed for steam or any other purpose, but more especially for superheated steam, and yet have none of the defects above noted.

In accordance with this invention the valve-case has a passage through it from end to end, and also an opening into it at right angles to said passage, in which opening the valve proper or plug is placed. This opening is made tapering, and the valve proper or plug is made correspondingly tapering. The valve proper, which resembles a plug, is made hollow and is closed at that end of smallest diameter. It has an inlet or inlets near the end of largest diameter, and an outlet which terminates near the end of smallest diameter, so that the course of the steam or other material through the valve is in a direction toward the smaller or closed end of the tapering plug, acting to drive it more firmly into the tapering socket or opening which receives it. A suitable plate is employed to close the opening in which the plug is placed and constituting a closed end for the larger end of the tapering plug.

Figure 1 shows in vertical section a valve embodying this invention; Fig. 2, a left-hand side view of the valve proper or plug; Fig. 3, a right-hand side view of the valve proper or plug; Figs. 4 and 5, sectional and edge views of the packing-ring which may be employed.

The valve-case $a$ has a circular tapering socket formed in it, which receives a tapering plug $a'$, secured to a valve-stem $d'$, passing through the said case in continuation of the plug. A hand-wheel $a^3$ is secured to the stem $d'$, by which it and the plug $a'$ are rotated.

The plug $a'$ is made a little shorter than the depth of the socket, so as to leave a chamber between the smaller end of the plug and the smaller end of the socket. This tapering plug $a'$ is made hollow, as shown, and open at its larger end. The plug $a'$ at one side, near its larger end, has one or two small inlet openings or passages $e\ e$, and at the opposite side has a larger outlet opening or passage $e'$, terminating near the upper end of the plug.

The valve-case $a$ has at one end an inlet-passage $b$, curved or directed downwardly from the end to the tapering socket, communicating with said socket near its larger end and at the inlet openings or passages $e\ e$. The valve-case $a$ has also an outlet-passage $b'$ opposite the inlet-passage $b$ and curved or directed downwardly from at or near the smaller end of the tapering socket to the end of the case, thereby communicating with said socket near its upper end and with the outlet-passage $e'$ of the plug $a'$.

To hold the tapering plug in the valve-case, a plate $g$ is screwed into the socket, which may bear against the larger end of the tapering plug, and may be adjusted in any suitable manner, although I prefer to interpose a ring $f$ between the larger end of the plug $a'$ and the plate $g$, which ring has transverse or radial openings $f'$ through it. The ring $f$ and plate $g$ may be formed in one piece, if desired. When the plug $a'$ is in the position shown to permit the steam to pass through it, the steam will pass down the declined passage $b$, through the ports or passages $e\ e$ into the hollow or chambered plug $a'$, thence through the port or passage $e'$, and down the declined passage $b'$. It will be seen that the direction the steam takes in the plug $a'$ is upward or toward the smaller closed end of the plug $a'$ and acts to drive and hold the plug steam-tight in the socket. When the plug is given a quarter-turn, the steam will pass down the declined portion $b$ and through the ports, passages, or holes $f'$ in the ring $f$ and into the plug $a'$, acting in substantially the same manner as before described. By this construction it will be seen that the smaller end of the plug snugly fits the tapering socket at its smaller end, and by the pressure of the steam is held steam-tight; also, it will be seen that no stuffing-box or packing is required, the omission of which, as before stated, is the chief object of this invention.

I claim—

1. In a valve, a valve-case having a tapering socket and inlet and outlet passages and a tapering hollow plug in said socket, combined with a plate $g$ and a ring having holes through it interposed between the plate and plug, substantially as described.

2. In a valve, a valve-case having a tapering socket and inlet and outlet passages and a tapering hollow plug in said socket, having inlet and outlet passages, combined with passages $f'$, through which communication with the interior of the plug is continually established, substantially as described.

In testimony whereof I have signed my name to this specification in the presence of two subscribing witnesses.

WILLIAM H. KELLY.

Witnesses:
ARABELLA KELLY,
M. J. CONWAY.